United States Patent
Lim

(10) Patent No.: US 10,601,085 B2
(45) Date of Patent: Mar. 24, 2020

(54) APPARATUS AND METHOD FOR ESTIMATING TEMPERATURE OF BATTERY, AND APPARATUS AND METHOD FOR MANAGING BATTERY

(71) Applicant: Samsung Electronics Co., Ltd., Suwon-si (KR)

(72) Inventor: Ju Wan Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 549 days.

(21) Appl. No.: 15/291,464

(22) Filed: Oct. 12, 2016

(65) Prior Publication Data

US 2017/0104248 A1 Apr. 13, 2017

(30) Foreign Application Priority Data

Oct. 12, 2015 (KR) ........................ 10-2015-0142428

(51) Int. Cl.
*H01M 10/48* (2006.01)
*H01M 10/42* (2006.01)

(52) U.S. Cl.
CPC ...... *H01M 10/486* (2013.01); *H01M 10/4285* (2013.01)

(58) Field of Classification Search
CPC ........... H01M 10/486; H01M 10/4285; H01M 10/48; H01M 10/44; H01M 10/443; H01M 10/441; H01M 10/484; H01M 10/46; H01M 10/482; H01M 10/488; H01M 10/60; H01M 10/61; H01M 10/63; H02J 7/0042; H02J 7/0045; H02J 7/0026; H02J 7/0029; G01R 31/36; G01R 31/3648; G01R 31/3627; G01R 31/3662; G01R 31/3631; G01R 31/3675; G01R 31/3606; G01R 31/3682;
(Continued)

(56) References Cited

U.S. PATENT DOCUMENTS

| 6,137,269 | A | 10/2000 | Champlin | |
|---|---|---|---|---|
| 6,469,512 | B2* | 10/2002 | Singh | G01R 31/392 324/426 |
| 8,961,004 | B2* | 2/2015 | Srinivasan | H01M 2/34 374/45 |
| 9,229,061 | B2 | 1/2016 | Hebiguchi | |

(Continued)

FOREIGN PATENT DOCUMENTS

| JP | 2003-508759 A | 3/2003 |
|---|---|---|
| JP | 2010-135075 A | 6/2010 |

(Continued)

OTHER PUBLICATIONS

Raijmakers, L.H.J. et al., "Sensorless battery temperature measurements based on electrochemical impedance spectroscopy," Journal of Power Sources, vol. 247, 2014 (pp. 539-544).

(Continued)

*Primary Examiner* — Anthony R Jimenez
(74) *Attorney, Agent, or Firm* — NSIP Law

(57) ABSTRACT

A battery temperature estimating apparatus, the apparatus includes an alternating current (AC) power supply configured to apply AC power to a battery; a phase difference measurer configured to measure a phase difference between an AC current and an AC voltage of the battery; and an internal temperature estimator configured to estimate an internal temperature of the battery based on the measured phase difference and a state of charge (SoC) of the battery.

26 Claims, 8 Drawing Sheets

(58) Field of Classification Search
CPC ............ G01R 31/3696; G01R 31/3651; G01R 31/3658; Y02E 60/12; Y02E 60/122; Y02E 60/7005; Y02E 60/7011; G01K 1/14
USPC .................................. 429/461, 61; 374/45
See application file for complete search history.

(56) References Cited

U.S. PATENT DOCUMENTS

2009/0251103 A1* 10/2009 Yamamoto ............... B60K 6/48
                                                          320/133
2014/0372055 A1   12/2014 Wang et al.

FOREIGN PATENT DOCUMENTS

| JP | 2011-14395 A | 1/2011 | |
|---|---|---|---|
| JP | 2013-543237 A | 11/2013 | |
| KR | 10-2014-0020499 A | 2/2014 | |
| WO | WO-2012054473 A1 * | 4/2012 | ............ H01M 2/34 |
| WO | WO 2013/018641 A | 2/2013 | |

OTHER PUBLICATIONS

Sathyanarayana, S. et al., "Impedance parameters and the state-of charge. I. Nickel-cadmium battery," Journal of applied electrochemistry, vol. 9.1, 1979 (pp. 125-139).

Srinivasan, R. et al., "Instantaneous measurement of the internal temperature in lithium-ion rechargeable cells," Electrochimica Acta, vol. 56.17, 2011 (pp. 6198-6204).

Waldmann, T. et al., "A mechanical aging mechanism in lithium-ion batteries," Journal of The Electrochemical Society, vol. 161.10, 2014 (pp. A1742-A1747).

* cited by examiner

APPARATUS AND METHOD FOR ESTIMATING TEMPERATURE OF BATTERY, AND APPARATUS AND METHOD FOR MANAGING BATTERY

CROSS-REFERENCE TO RELATED APPLICATION(S)

This application claims the benefit under 35 USC 119(a) of Korean Patent Application No. 10-2015-0142428, filed on Oct. 12, 2015, in the Korean Intellectual Property Office, the entire disclosure of which is incorporated herein by reference for all purposes.

BACKGROUND

1. Field

The following description relates to a battery management technology, and more specifically, to an apparatus and method for estimating a temperature of a battery and an apparatus and method for managing a battery.

2. Description of Related Art

Secondary cells are made with high power and large capacity in order to be used as power sources of electric cars, hybrid cars, etc. A plurality of secondary cells are connected to each other in series or in parallel and are used as e.g. a medium and large battery pack. Such a high-power and large-capacity battery pack generates a great deal of heat in the process of charging and discharging.

Accordingly, studies to precisely measure an internal temperature of such batteries continue.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a battery temperature estimating apparatus includes an alternating current (AC) power supply configured to apply AC power to a battery; a phase difference measurer configured to measure a phase difference between an AC current and an AC voltage of the battery; and an internal temperature estimator configured to estimate an internal temperature of the battery based on the measured phase difference and a state of charge (SoC) of the battery.

The AC power supply may include either one or both of an AC current source and an AC voltage source.

The AC power supply may be further configured to select an oscillation frequency for the AC power to substantially minimize an impedance of an electrochemical reaction at electrodes of the battery.

The AC power supply may be further configured to: select the oscillation frequency by applying AC power of various frequencies to the battery in a state of various internal temperatures and various SoC of the battery, measure the phase difference between the AC current and the AC voltage according to the internal temperature and SoC for each frequency, and select a frequency having a distinction of the phase difference among the various frequencies of the AC power applied to the battery.

The internal temperature estimator may be configured to estimate the internal temperature of the battery based on the phase difference and a temperature estimation equation that defines a relation between the SoC and the internal temperature.

The temperature estimator may be further configured to generate a temperature estimation equation by applying the AC power to the battery in a state of various internal temperatures and various SoC of the battery, measure the phase difference between the AC current and the AC voltage according to the internal temperature and the SoC, and correlate the internal temperature of the battery, the SoC, and the phase difference therebetween.

An apparatus may further include a surface temperature measurer configured to measure a surface temperature of the battery.

According to another general aspect, a method of estimating a temperature of a battery, includes applying an alternating current (AC) power to a battery; measuring a phase difference between an AC current and an AC voltage of the battery; and estimating an internal temperature of the battery based on the measured phase difference and state of charge (SoC) of the battery.

The AC power may maintain either one or both of a substantially constant AC current and a substantially constant AC voltage.

An oscillation frequency may be selected for the AC power to substantially minimize an impedance of an electrochemical reaction at electrodes of the battery.

The oscillation frequency may be selected by: applying AC power of various frequencies to the battery in a state of various internal temperatures and various SoC of the battery, measuring the phase difference between the AC current and the AC voltage according to the internal temperature and SoC for each frequency, and selecting a frequency having a distinction of the phase difference among the various frequencies of the AC power applied to the battery.

The estimating of the internal temperature of the battery may include estimating the internal temperature of the battery based on the phase difference and a temperature estimation equation that defines a relation between the SoC and the internal temperature.

The temperature estimation equation may be acquired by: applying the AC power to the battery in a state of various internal temperatures and various SoC of the battery, measuring the phase difference between the AC current and the AC voltage according to the internal temperature and the SoC, and correlating the internal temperature of the battery, the SoC, and the phase difference therebetween.

According to another general aspect, a battery management apparatus includes a voltmeter configured to measure a voltage of a battery; an ammeter configured to measure a current of the battery; and, a processor configured to: measure a phase difference between an AC current and AC voltage of an AC power supplied to the battery; estimate an internal temperature of the battery based on the measured phase difference and a state of charge (SoC) of the battery; and manage the battery based on the estimated internal temperature, the measured voltage, and the measured current.

An apparatus may further include an AC power supply configured to supply the AC power of an oscillation frequency to the battery, wherein the oscillation frequency is selected to substantially minimize an impedance caused by an electrochemical reaction at electrodes of the battery.

The processor may be further configured to: select the oscillation frequency by applying AC power of various frequencies to the battery in a state of various internal temperatures and various SoC of the battery, measure the phase difference between the AC current and the AC voltage according to the internal temperature and SoC for each frequency, and select a frequency having a distinction of the phase difference among the various frequencies of the AC power applied to the battery.

An apparatus may further include a temperature estimator configured to estimate the internal temperature of the battery based on the phase difference and a temperature estimation equation that defines a relation between the SoC and the internal temperature.

The temperature estimator may be further configured to generate the temperature estimation equation by: applying the AC power to the battery in a state of various internal temperatures and various SoC of the battery, measuring the phase difference between the AC current and the AC voltage according to the internal temperature and the SoC, and correlating the internal temperature of the battery, the SoC, and the phase difference therebetween.

The processor may be further configured to estimate the SoC and state of health (SoH) of the battery based on the estimated internal temperature, the measured voltage, and the measured current.

An apparatus may further include a battery manager configured to either one or both of: control heat of the battery and adjust either one or both of the voltage or current of the battery based on the estimated internal temperature, the measured voltage, and the measured current.

The selecting the frequency having the distinction of the phase difference may be based on a magnitude of the phase difference between the various frequencies.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1:
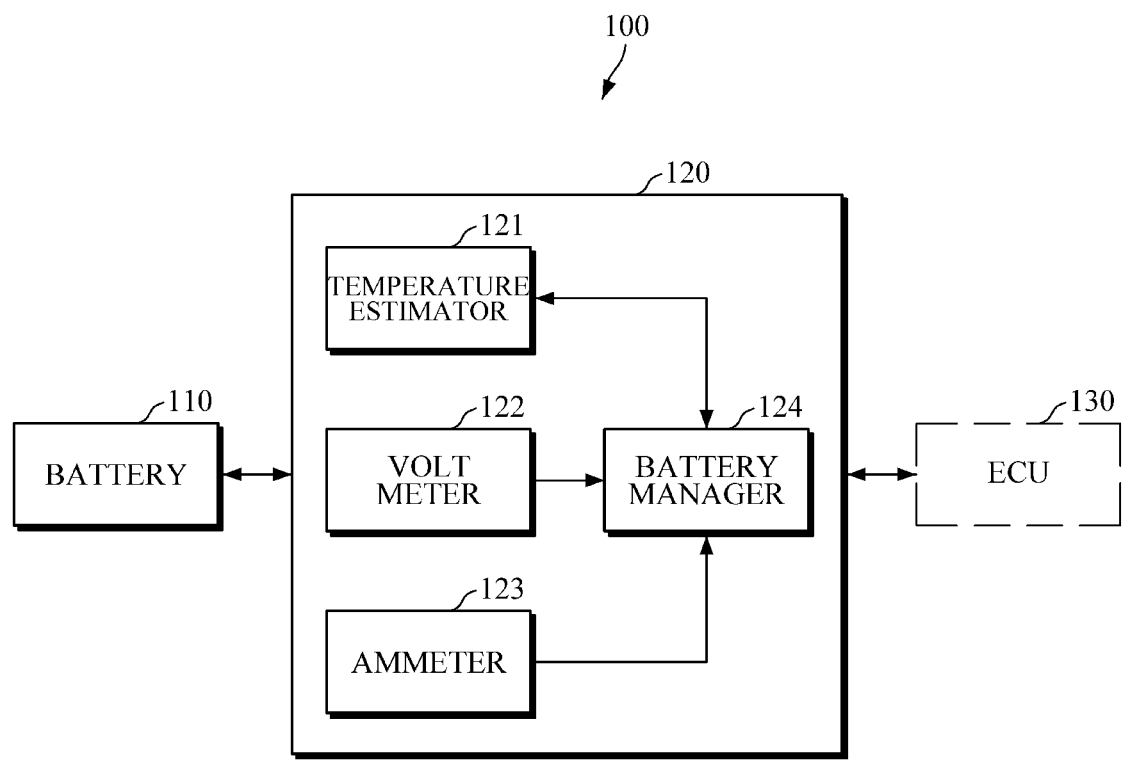
FIG. 1 is a block diagram illustrating an example of a battery system.

FIG. 1 is a block diagram illustrating an example of a battery system.

Referring to FIG. 1, a battery system 100 includes a battery 110 and an apparatus 120 for managing a battery.

The battery 110 provides power to a device where a battery system 100 is installed. The battery 110, in an embodiment, includes a battery pack. The battery pack includes a plurality of battery modules connected in series and/or in parallel, and each of the battery modules includes a plurality of interconnected battery cells. In an embodiment, each of the battery modules or each of the battery cells are secondary cells, such as a nickel-metal hydride (Ni-MH) battery, a Lithium-ion (Li-ion) battery, Lithium-Polymer (Li-Po), or any other suitable chemistry. In addition, the capacity of each of the battery modules may be the same or different from each other.

The apparatus 120 monitors a state of the battery 110, and based on the monitoring result, manages the battery. To this end, the apparatus 120 includes a temperature estimator 121, a voltmeter 122, a ammeter 123, and a battery manager 124.

The temperature estimator 121 applies AC power of a predetermined frequency to the battery 110, then measures a phase difference between an AC current flowing in the battery 110 and AC voltage applied to the battery 110, and estimates an internal temperature of the battery 110 based on the measured phase difference and state of charge (SoC) of the battery 110. The AC power, according to an embodiment, is an AC current source or an AC voltage source; and the SoC of the battery 110 may be a value in a fully charged state or a completely discharged state of the battery 110, or may be a value in the SoC which is primarily estimated by the battery manager 124.

The temperature estimator 121 is described with reference to FIG. 2.

The voltmeter 122 measures a voltage of the battery 110, and the ammeter 123 estimates a current of the battery 110. The voltage measured by the voltmeter 122 is, for example, a DC voltage; and the current measured by the ammeter 123 is, for example, a DC current.

In one embodiment, the ammeter 123 includes a hall current transformer (CT) that measures a current by using a hall element and outputs, as an analog current signal, corresponding to the measured current. However, the ammeter 123 is not limited thereto, and may include one or more other elements that are capable of sensing a current.

The battery manager 124 estimates a state of charge (SoC) of a plurality of battery modules, state of health (SoH), etc. based on, for example, an internal temperature, voltage and current, etc. of the battery. The SoC refers to information regarding a quantity of electric charge that has been charged in the battery 110, and the SoH refers to information regarding how much the performance of the battery 110 has been degraded compared to when it was manufactured.

In one embodiment, the battery manager 124 estimates the SoC of the battery 110 through coulomb counting, an equivalent circuit modeling technique, an electrochemical modeling technique, a data-based technique, or other suitable SoC measurement techniques as would be known to one of skill in the art after gaining a thorough understanding of the disclosure. The above-mentioned methods are only examples, and the methods thereof are not limited thereto. The battery manager 124 may estimate the SoC of the battery 110 in various ways such as by any one or any weighted combination of two or more of a chemical analysis (e.g. specific gravity or pH of the electrolyte), voltage, current integration, Kalman filtering model, load deviation, capacity fade, heat, or pressure.

In one embodiment, the battery manager 124 estimates SoC of the battery 110 using an open-circuit voltage (OCV) technique for measuring OCV of the battery 110 to estimate the SoC, or by using an electrochemical impedance spectroscopy (EIS) technique for measuring internal resistance of the battery 110 to estimate the SoH. In another example, any one or any weighted combination of two or more of internal resistance, impedance, conductance, capacity, voltage, self-discharge, ability to accept a charge, number of chare-discharge cycles may be employed to calculate an SoH of the battery. However, the above-mentioned methods are only examples, and the methods thereof are not limited thereto, and the battery manager 124 may estimate the SoC and the SoH of the battery 110 in various ways as would be known to one of skill in the art after gaining a thorough understanding of the disclosure.

Based on an internal temperature of the battery 110 estimated by the temperature estimator 121, voltage of the battery 110 measured by the voltmeter 122, and a current of the battery 110 measured by the ammeter 123, the battery manager 124 is configured to adaptively control the heat of the battery 110 by controlling a cooling system or a heating system so that the internal temperature and voltage of the battery 110 are maintained within a set range. Also, the battery manager 124 prevents the battery 110 from being over-charged and over-discharged, and performs cell balancing, thereby controlling the SoC between a plurality of battery modules to be balanced. Accordingly, energy efficiency is increased, and battery lifespan is extended.

According to one or more embodiments, the battery manager 124 provides SoC and SoH of the battery 110 to an electronic control unit (ECU) 130. The battery manager 124 communicates with the ECU 130 through a controller area network communications, for example. However, the ECU 130 may employ other measures as would be known by one of skill in the art after gaining a thorough understanding of the disclosure.

Figure 2:
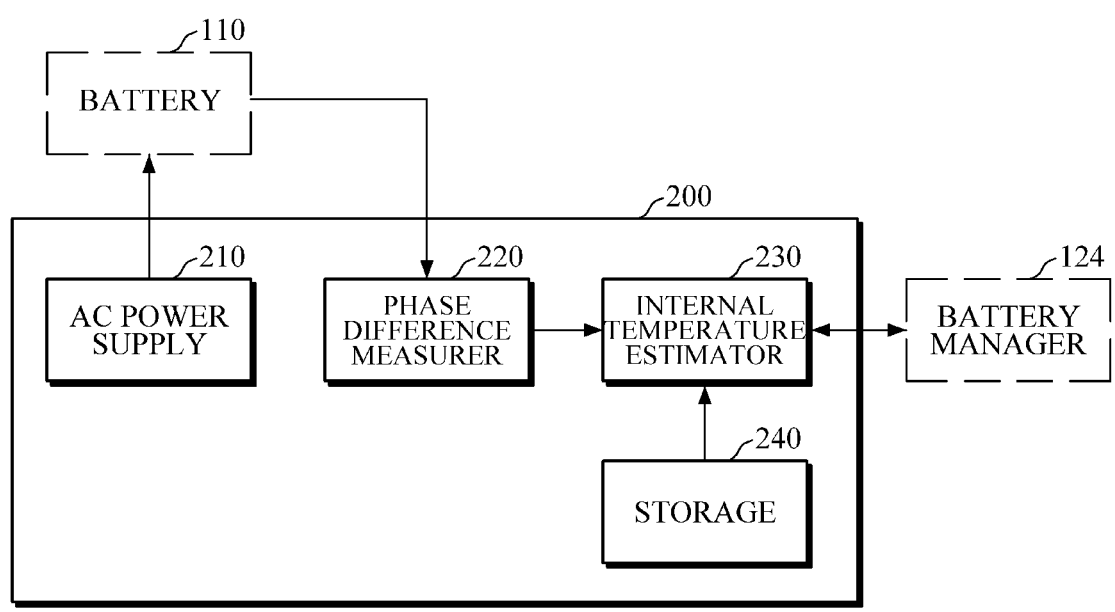
FIG. 2 is a block diagram illustrating an example of an apparatus for estimating a temperature.

FIG. 2 is a block diagram illustrating an example of an apparatus for estimating a temperature.

Apparatus 200 for estimating a temperature is one non-limiting example implementation of a temperature estimator 121 illustrated in FIG. 1.

Referring to FIG. 2, the apparatus 200 includes an AC power supply 210, a phase difference measurer 220, an internal temperature estimator 230, and storage (memory) 240.

The AC power supply 210 applies AC power of a predetermined frequency to the battery 110. The AC power is one of an AC current source and an AC voltage source.

A frequency of the AC power to be applied is selected for minimizing or reducing an effect of impedance caused by an electrochemical reaction, which occurs at electrodes of the battery 110, and the frequency may be experimentally predetermined. For example, AC power of various frequencies (e.g., 10 Hz to 10000 Hz) is applied to the battery in a state of various internal temperatures and various SoC of the battery; a phase difference between the AC current flowing in the battery and the AC voltage applied to the battery according to a battery's internal temperature and SoC for each frequency is measured; and among the various frequencies applied to the battery, a frequency whose distinction of the phase difference according to the internal temperature and the SoC is the most clear is determined, according to one or more embodiments, to be a frequency of the AC power.

The phase difference measurer 220 measures the phase difference between the AC current flowing in the battery 110 and the AC voltage applied to the battery 110.

The internal temperature estimator 230 estimates the internal temperature of the battery 110 based on the phase difference measured in the phase difference measurer 220 and the SoH of the battery 110. Here, the SoC of the battery 110 may be a value in a fully charging state or in fully discharged state, or may be a value in the SoC which is primarily estimated by the battery manager 124.

In one embodiment, the internal temperature estimator 230 estimates an internal temperature of the battery 110 by using a temperature estimation equation. The temperature estimation equation is one that defines a relation between the following: a phase difference between the AC current flowing in the battery 110 and the AC voltage applied to the battery 110 when AC power of a predetermined frequency is applied; the SoC of the battery 110; and an internal temperature of the battery 110. The temperature estimation equation may be experimentally acquired in advance according to the particulars of the battery. For example, the temperature estimation equation is acquired through the following operations: applying AC power of a predetermined frequency to the battery in a state of various internal temperatures and various SoC of the battery; measuring a phase difference between the AC current flowing in the battery and the AC voltage applied to the battery according to the battery's internal temperature and SoC; and correlating the battery's internal temperature, the SoC, and the phase difference therebetween.

The storage 240 stores a program for processing and controlling the apparatus 200. Also, the storage 240, according to an embodiment, stores a temperature estimation equation that is used to estimate an internal temperature of the battery 110, information on a phase difference between the AC current and the AC voltage which are measured by the phase difference measurer 220, and the internal temperature of the battery 110 which is estimated by the internal temperature estimator 230.

The storage 240 includes any one or any combination of two or more of the following storage media: a flash memory type, a hard disk type, a multimedia card micro type, and a card type (e.g., SD or XD memory, etc.), random access memory (RAM), static random access memory (SRAM), read only memory (ROM), electrically erasable programmable read only memory (EEPROM), programmable read only memory (PROM), magnetic memory, a magnetic disk, an optical disk, etc.

FIGS. 3A-3D are diagrams illustrating a method of determining a frequency of AC power.

As impedance of a battery, there are the following impedances: impedance caused by the electrochemical reaction at electrodes (positive and negative electrodes); ion transmission impedance occurring on a negative electrode surface solid electrolyte interphase (SEI); impedance caused by the ion movement in electrolytes; electric impedance occurring in a conductive agent, etc. The impedance caused by the electrochemical reaction at double electrodes (positive and negative electrodes) occurs in an AC area lower than a predetermined frequency, and is affected by various variables, such as Li concentration, temperature, and degradation degree inside an active material, and a Li concentration gradient on an electrode surface. That is, the impedance caused by the electrochemical reaction at electrodes (positive and negative electrodes) hardly has an effect on higher-frequency AC than a predetermined value, thereby minimizing the effect thereof. For example, in a case of 3300 mAh-class 18650-cell Li-ion batteries, the effect of the impedance caused by the electrochemical reaction at electrodes (positive and negative electrodes) may be substantially minimized at a frequency of approx. 1000 Hz.

A frequency, which substantially minimizes the effect of the impedance caused by the electrochemical reaction at electrodes (positive and negative electrodes), may be different according to the battery's size, chemistry, and capacity. In a case of a battery, the more active materials, the bigger the capacity becomes, and the smaller the resistance becomes. As such, when the size and capacity of the battery become large, the frequency for minimizing the effect of the impedance caused by the electrochemical reaction at electrodes (positive and negative electrodes) becomes small.

In one embodiment, a frequency of the AC power is one for substantially minimizing an effect of impedance caused by an electrochemical reaction, which occurs at electrodes of the battery, and the frequency may be experimentally predetermined. For example, AC power of various frequencies (e.g., 10 Hz to 10000 Hz) is applied to the battery in a state of various internal temperatures and various SoC of the battery; a phase difference between the AC current flowing in the battery and the AC voltage applied to the battery according to a battery's internal temperature and SoC for each frequency is measured; and among the various frequencies applied to the battery, a frequency whose distinction of the phase difference according to the internal temperature and the SoC is the most clear may be determined to be a frequency of the AC power.

Figure 3A:
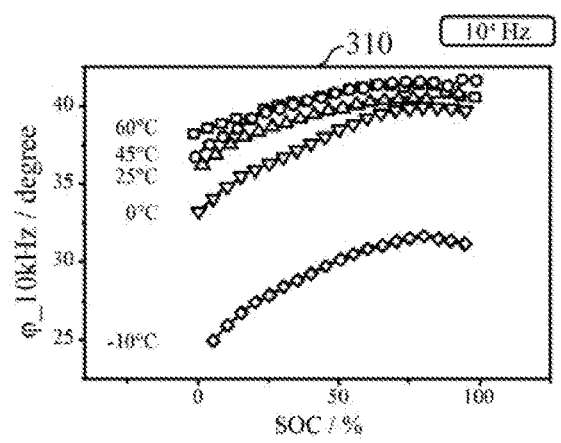
FIGS. 3A-3D are diagrams illustrating a method of determining a frequency of AC power.
Figure 3B:
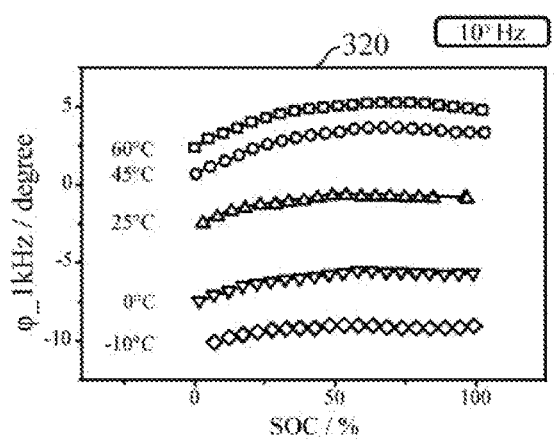
Figure 3C:
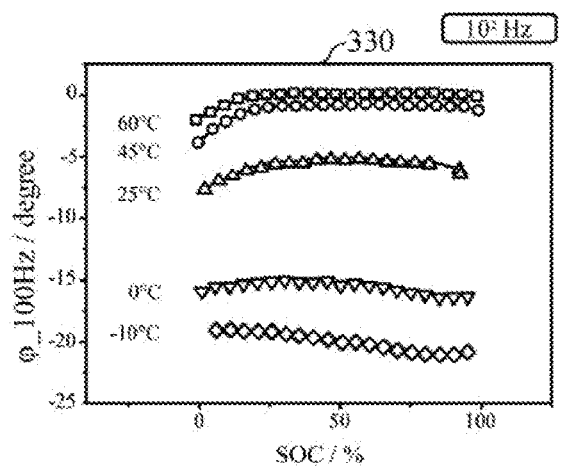
Figure 3D:
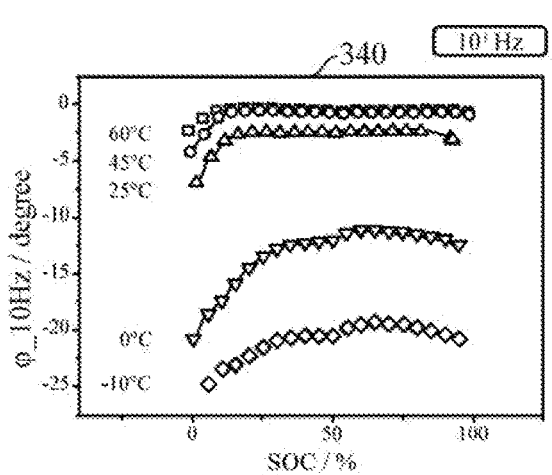

Referring to FIG. 3A, reference numeral 310 refers to a phase difference that is measured when AC power of 10000 Hz frequency is applied to the battery of various SoC and various internal temperatures. In addition, referring to FIG. 3B, reference numeral 320 refers to a phase difference that is measured when AC power of 1000 Hz frequency is applied to the battery of various SoC and various internal temperatures. Moreover, referring to FIG. 3C, reference numeral 330 refers to a phase difference that is measured when AC power of 100 Hz frequency is applied to the battery of various SoC and various internal temperatures. Furthermore, referring to FIG. 3D, reference numeral 340 refers to a phase difference that is measured when AC power of 10 Hz frequency is applied to the battery of various SoC and various internal temperatures.

In the case of an example, the distinction of a phase difference for each interval temperature (particularly, 60° C., 45° C., 25° C., and 0° C.), which is measured in a case where the AC power of 10000 Hz frequency is applied to a battery in 310, becomes ambiguous as SoC of the battery increases. In addition, the distinction of a phase difference for each interval temperature (particularly, 60° C. and 45° C.), which is measured in a case where the AC power of 10 Hz frequency is applied to the battery in 340, also becomes ambiguous as the SoC of the battery increases.

Meanwhile, with regard to the case where the AC power of 1000 Hz frequency is applied to the battery in 320, and the case where the AC power of 100 Hz frequency is applied to the battery in 330, the distinction of a phase difference for each interval temperature is comparatively clear. However, comparing the case where the AC power of 1000 Hz frequency is applied to the battery in 320 and the case where the AC power of 100 Hz frequency is applied to the battery in 330, the case of 320 shows an even clearer distinction in the phase difference for each interval temperature than the case of 330.

Accordingly, the 1000 Hz frequency showing a clear distinction in the phase difference for each temperature is determined as a frequency of AC power which is used in estimating an internal temperature of the battery.

Figure 4:
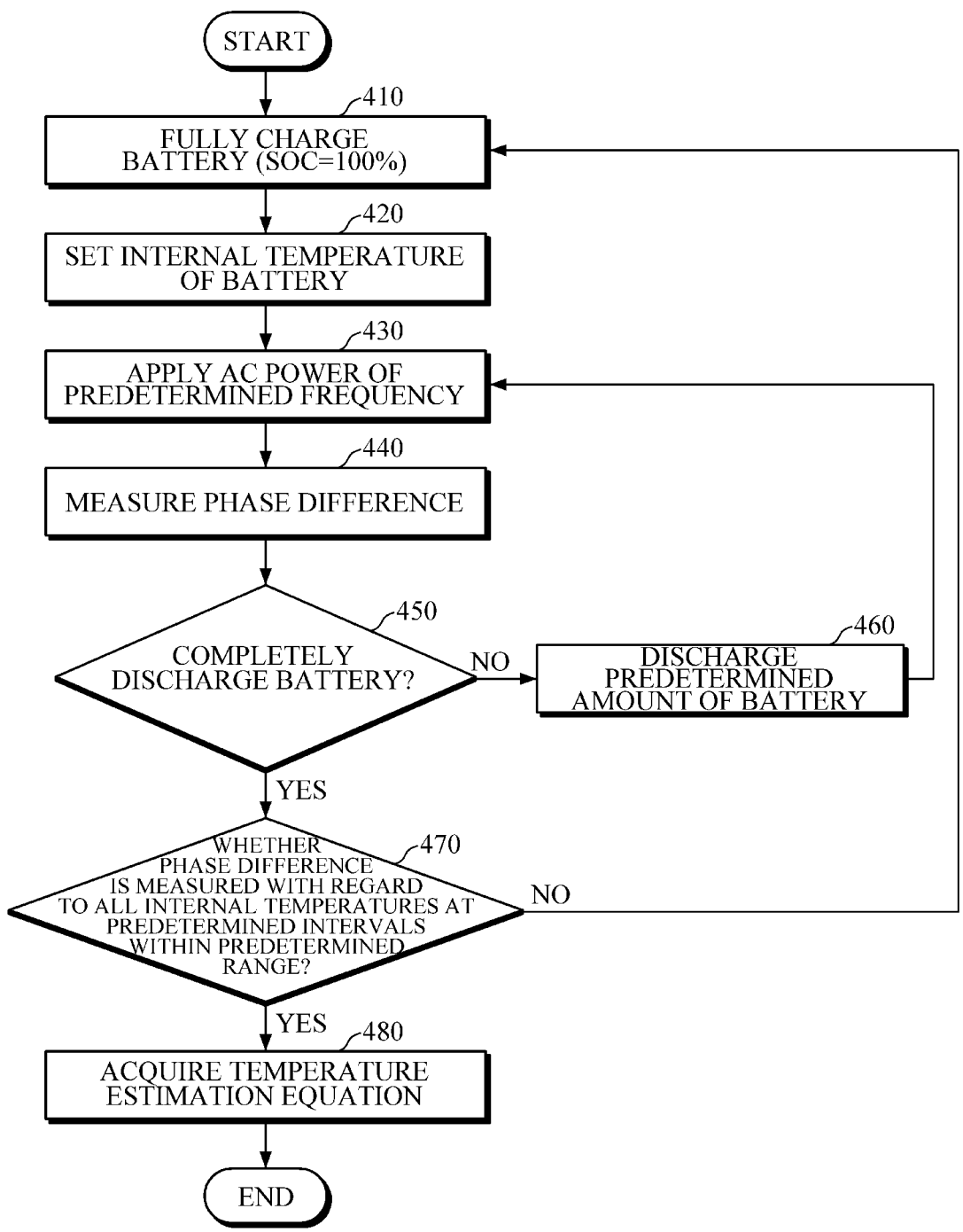
FIG. 4 is a diagram illustrating a method of acquiring a temperature estimation.

FIG. 4 is a diagram illustrating a method of acquiring a temperature estimation equation.

Referring to FIG. 4, a method of acquiring a temperature estimation equation includes fully charging a battery in 410.

An internal temperature of a battery to be measured is set in 420. For example, the internal temperature of a battery to be measured is set within a range of about −20° C.~60° C.

AC power of a predetermined frequency is applied to the battery in 430. The AC power is one of an AC current source and an AC voltage source. Also, the AC power's frequency (a predetermined frequency established as described above) is one for substantially minimizing an effect of impedance caused by an electrochemical reaction, which occurs at electrodes of the battery, and the frequency may be experimentally determined in advance.

A phase difference between an AC current flowing in the battery and AC voltage applied to the battery is measured in 440.

Through the determination of the battery's SoC, it is determined whether the battery is completely discharged in 450.

In response to the determination in 450, if the battery is not completely discharged, a predetermined amount of battery is discharged in 460, and the process goes back to 430, then after the AC power of a predetermined frequency is applied to a battery, whose predetermined amount is discharged, a phase difference between the AC current flowing in the battery and AC voltage is measured in 440. Through these operations, the phase difference according to various SoC of the battery is measured with regard to a specific internal temperature of a predetermined frequency.

In response to the determination in 450, if the battery is completely discharged, it is determined whether the phase difference according to the SoC of the battery has been measured with regard to substantially all internal temperatures of the battery at intervals of, for example, about 5° C. within a range of about 20° C.~60° C. in 470. For example, it is determined whether a phase difference according to the SoC of the battery has been measured with regard to all internal temperatures of the battery at intervals of 5° C. within a range of −20° C.~60° C. The purpose of this operation is to acquire phase difference data for each temperature enough to calculate a temperature estimation equation, and a range and interval of the temperature may change according to a system's performance or purpose.

In response to the determination in 470, if the phase difference according to each SoC of the battery is not measured with regard to substantially all temperatures of the battery at predetermined intervals within a predetermined range, the process goes back to 410. Through this process, the phase difference according to various internal temperatures of the battery and various SoC of the battery are measured.

In response to the determination in 470, if the phase difference according to each SoC of the battery is measured with regard to substantially all temperatures of the battery at predetermined intervals within a predetermined range, the temperature estimation equation is acquired, in 480, by correlating an internal temperature of the battery, the SoC thereof, and phase difference therebetween.

FIG. 4 illustrates a measurement of a phase difference according to various SoC of a battery by completely charging the battery and then discharging the battery. However, the embodiment is not limited thereto, and it is possible to measure a phase difference according to various SoC of the battery by completely discharging the battery first and then charging the battery.

Figure 5:
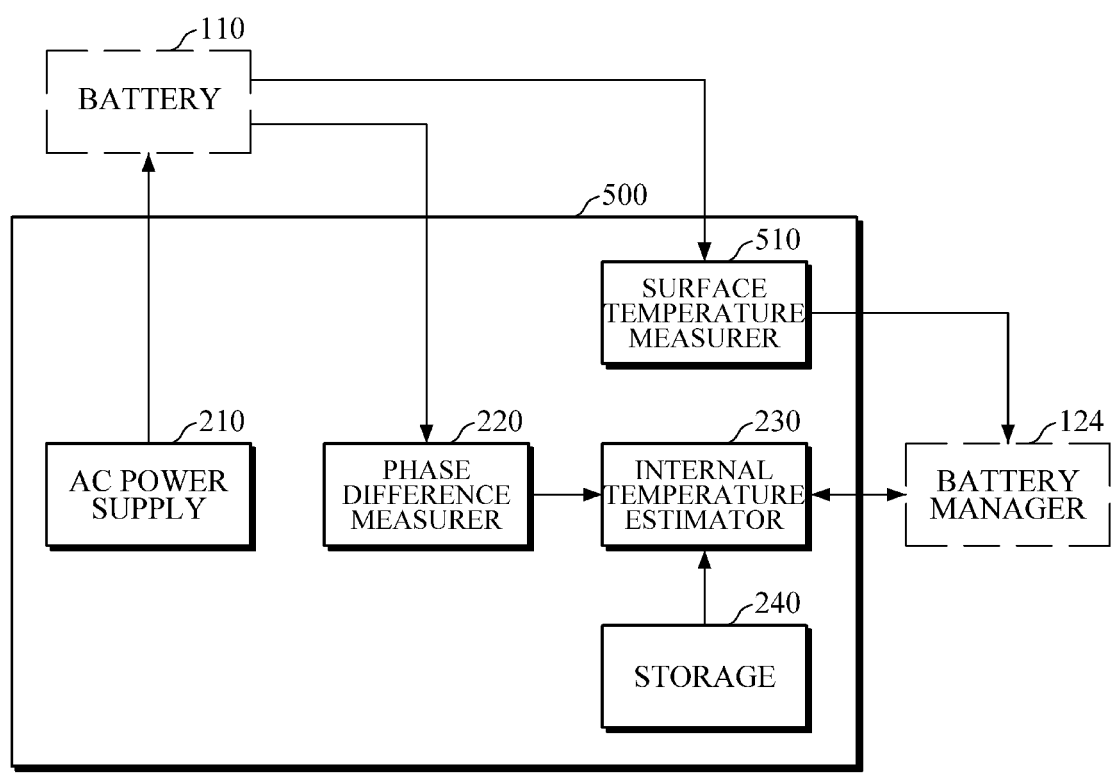
FIG. 5 is a block diagram illustrating an example of an apparatus for estimating temperature.

FIG. 5 is a block diagram illustrating another example of an apparatus for estimating temperature.

An apparatus 500 for estimating a temperature is another embodiment, for example, of a temperature estimator 121 in FIG. 1.

Referring to FIG. 5, the apparatus 500 further includes a surface temperature measurer 510 in comparison to an apparatus 200 for estimating a temperature, which is illustrated in FIG. 2.

The surface temperature measurer 510 measures a surface temperature of a battery 110. To this end, the temperature measurer 510 includes at least one temperature sensor (e.g., thermocouple) that are attached (either directly or indirectly) to a surface of the battery 110 to measure the surface temperature of the battery.

In this case, a battery manager 124 predicts whether a dangerous situation may occur by estimating the highest temperature of the inside of a battery. Also, the battery manager 124, according to an embodiment, control the heat of the battery 110 by controlling any one or any combination of two or more of: a cooling system or a heating system, or adjusts the voltage or current of the battery 110, so that the battery's internal highest temperature, internal average temperature, surface temperature, and voltage are maintained within a set range.

Figure 6:
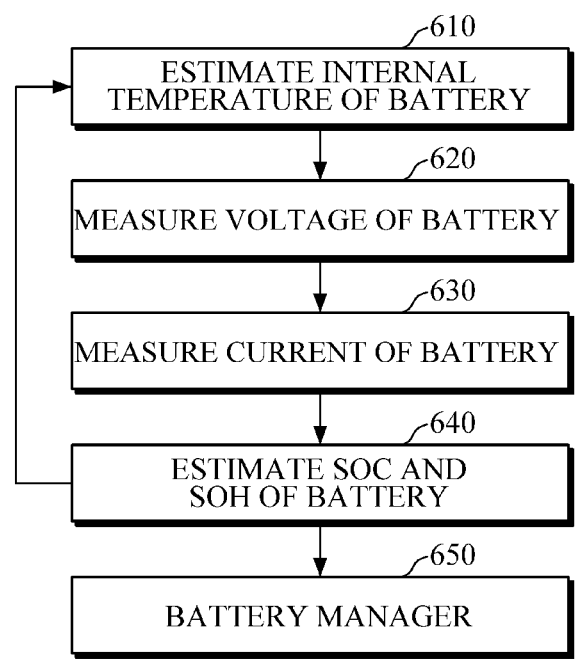
FIG. 6 is a flowchart illustrating an example of a method of managing a battery.

FIG. 6 is a flowchart illustrating an example of a method of managing a battery.

Referring to FIGS. 1 and 6, an apparatus 120 of managing a battery estimates an internal temperature of a battery, in 610, based on a phase difference between an AC current and AC voltage according to an application of AC power of a predetermined frequency, and based on SoC of the battery 110. Here, the AC power is an AC current source or an AC voltage source, and the SoC of the battery 110 is a value in a fully charged state or a completely discharged state of the battery 110, or a SoC value that is estimated in 640.

The apparatus 120 measures voltage of the battery 110 in 620 and a current of the battery 110 in 630. The voltage and the current measured by the apparatus 120 are a DC voltage and DC current.

The apparatus 120 estimates SoC, SoH, etc., of the battery based on an internal temperature, voltage, and a current of the battery 110. The SoC refers to information of a quantity of electric charges being charged in the battery 110; and the SoH refers to information of how much the performance of the battery 110 is degraded compared to the one when the battery was manufactured.

In one embodiment, the apparatus 120 estimates the SoC of the battery 110 through coulomb counting, an equivalent circuit modeling technique, an electrochemical modeling technique, a data-based technique, or other technique as would be known to one of skill in the art after gaining a thorough understanding of the disclosure. However, the above-mentioned methods are only examples, and the methods thereof are not limited thereto, and the apparatus 120 may estimate the SoC of the battery 110 in various ways.

In one embodiment, the apparatus 120 estimates SoC of the battery 110 by using an open-circuit voltage (OCV) technique for measuring OCV of the battery 110 to estimate the SoC, or by using an electrochemical impedance spectroscopy (EIS) technique for measuring internal resistance of the battery 110 to estimate the SoH. However, the above-mentioned methods are only examples, and the methods thereof are not limited thereto, and the apparatus 120 may estimate the SoC of the battery 110 in various ways.

The apparatus 120 manages the battery 110 based on any one or any combination of two or more of: the estimated internal temperature of the battery 110, the measured voltage thereof, the measured current thereof, and the estimated SoC and SoH thereof in 650.

For example, the apparatus 120 controls the heat of the battery 110 by controlling a cooling system or a heating system so that the internal temperature and voltage of the battery 110 is maintained within a set safe or nominal range. Also, the apparatus 120 prevents the battery 110 from being over-charged and over-discharged, and performs cell balancing, thereby controlling the SoC between a plurality of battery modules or cells to be balanced. Accordingly, energy efficiency is increased, safety is improved, and battery lifespan is extended.

The SoC value estimated in operation 640 is used in estimating an internal temperature of the battery in operation 610.

Figure 7:
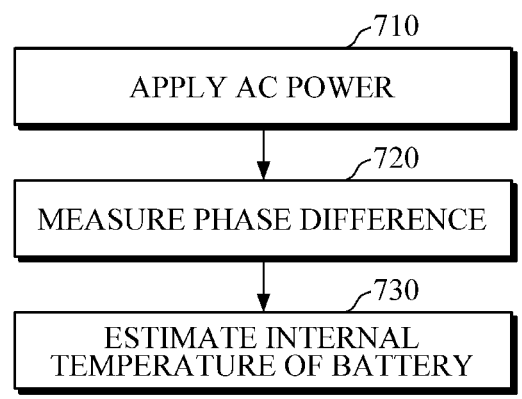
FIG. 7 is a flowchart illustrating an example of a method of estimating a temperature of a battery.

FIG. 7 is a flowchart illustrating an example of a method of estimating a temperature of a battery.

The method of estimating a temperature of a battery, which is illustrated in FIG. 7, is one embodiment of estimating an internal temperature of a battery, such as seen in operation 610 in FIG. 6.

Referring to FIGS. 2 and 7, an apparatus 200 configured to estimate a temperature applies AC power of a predetermined frequency to a battery 110 in 710. The AC power is an AC current source or an AC voltage source.

A frequency of the AC power is one selected for substantially minimizing an effect of impedance caused by an electrochemical reaction, which occurs at electrodes of the battery 110, and the frequency may be experimentally predetermined. For example, AC power of various frequencies (e.g., 10 Hz to 10000 Hz) is applied to the battery in a state of various internal temperatures and various SoC of the battery; a phase difference between the AC current flowing in the battery and the AC voltage applied to the battery according to a battery's internal temperature and SoC for each frequency is measured; and among the various frequencies applied to the battery, a frequency whose distinction of the phase difference according to the internal temperature and the SoC is the most clear (i.e. least ambiguous or having a greatest separation) is determined to be a frequency of the AC power.

The apparatus 200 measures the phase difference between the AC current flowing in the battery 110 and the AC voltage applied to the battery 110 in 720.

The apparatus 200 estimates the internal temperature of the battery 100 based on the measured phase difference and the SOH of the battery 110 in 730.

In one embodiment, the apparatus 200 estimates an internal temperature of the battery 110 by using a temperature estimation equation. The temperature estimation equation is one that defines a relation between the following: a phase difference between the AC current and the AC voltage of the battery 110 when AC power of a predetermined frequency is applied; the SoC of the battery 110; and an internal temperature of the battery 110. In an embodiment, the temperature estimation equation is acquired in advance according to the specific battery. For example, the temperature estimation equation is acquired through the following operations: applying AC power of a predetermined frequency to the battery in a state of various internal temperatures and various SoC of the battery; measuring a phase difference between the AC current flowing in the battery and the AC voltage applied to the battery according to the battery's internal temperature and SoC; and correlating the battery's internal temperature, SoC, and phase difference therebetween. The temperature estimation equation is specifically described above with reference to FIG. 4, which is not repeated here in the description of FIG. 7 for clarity and conciseness.

Figure 8:
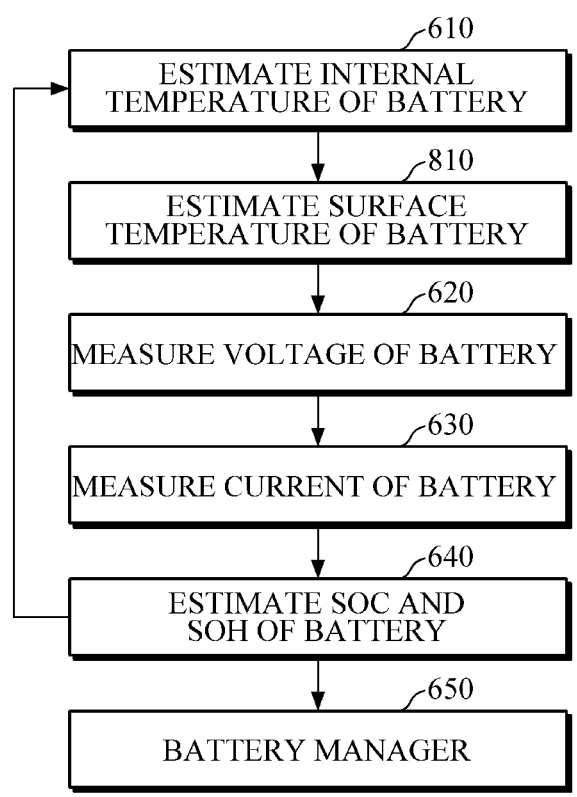
FIG. 8 is a flowchart illustrating another example of a method of managing a battery.

FIG. 8 is a flowchart illustrating another example of a method of managing a battery.

Referring to FIG. 8, a method of managing a battery further includes operation 810, in comparison to a method of managing a battery, which is illustrated in FIG. 6.

In operation 810, an apparatus, such as apparatus 120 for managing a battery measures a surface temperature of a battery. To this end, the apparatus 120 includes various temperature sensors (e.g., thermocouples) that are attached to a surface of the battery 110 to measure the surface temperature of the battery.

In this case, in operation 650, the apparatus 120 estimates the highest temperature of the inside of the battery by using the battery's surface temperature and internal temperature; and controls the heat of the battery 110 by controlling a cooling system or a heating system, or adjusting the voltage or current of the battery 110, so that the battery's internal highest temperature, internal average temperature, surface temperature, and voltage are maintained within a set range.

The methods and/or operations described above, according to an embodiment, are recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

The temperature estimator 121, phase difference measurer 220 and internal temperature estimator 230 in FIGS. 1, 2, and 5 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4, 6, 7, and 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMS, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery temperature estimating apparatus, the apparatus comprising:
   an alternating current (AC) power supply configured to apply AC power to a battery at an oscillation frequency;
   a phase difference measurer configured to measure a phase difference between an AC current and an AC voltage of the battery to which the AC power is applied; and
   an internal temperature estimator configured to estimate an internal temperature of the battery based on the measured phase difference and a state of charge (SoC) of the battery,
   wherein the oscillation frequency is predetermined to maximize a difference between the phase difference of the battery at different internal temperatures of the battery.

2. The apparatus of claim 1, wherein the AC power supply comprises either one or both of an AC current source and an AC voltage source.

3. The apparatus of claim 1, wherein the battery temperature estimating apparatus is a battery management system further comprising:
   a surface temperature measurer configured to measure a surface temperature of the battery; and
   a battery manager configured to control operation of the battery management system based on the measured surface temperature and the estimated internal temperature.

4. The apparatus of claim 1, wherein the AC power supply is further configured to set the oscillation frequency for the AC power to substantially minimize an impedance of an electrochemical reaction at electrodes of the battery.

5. The apparatus of claim 4, wherein the AC power supply is further configured to:
   set the oscillation frequency based on a selecting of the oscillation frequency by applying AC power of various frequencies to the battery in a state of various internal temperatures and various SoCs of the battery,
   measure respective phase differences between the AC current and the AC voltage according to a corresponding internal temperature and a corresponding SoC for each of the various frequencies, and
   select the oscillation frequency that has a distinction of the phase difference among the various frequencies of the AC power applied to the battery.

6. The apparatus of claim 1, wherein the internal temperature estimator is configured to estimate the internal temperature of the battery based on the phase difference and a temperature estimation equation that defines a predetermined relationship between phrase differences, internal temperatures, and states of charge (SoCs), including a relationship between the phase difference, the SoC, and the internal temperature.

7. The apparatus of claim 6, wherein the temperature estimator is further configured to:
   generate the temperature estimation equation, defining the relationship between the phrase differences, the internal temperatures, and the states of charge (SoCs), by applying the AC power to the battery in a state of various internal temperatures and various SoC of the battery,
   measure respective phase differences between the AC current and the AC voltage according to the various internal temperatures and the various SoCs, and correlate the various internal temperatures of the battery, the various SoCs, and the respective phase differences.

8. A method of estimating a temperature of a battery, the method comprising:
applying an alternating current (AC) current to a battery at an oscillation frequency;
measuring a phase difference between the AC current and an AC voltage applied to the battery; and
estimating an internal temperature of the battery based on the measured phase difference and state of charge (SoC) of the battery,
wherein the oscillation frequency is predetermined to maximize a difference between the phase difference of the battery at different internal temperatures of the battery.

9. The method of claim 8, wherein an AC power maintains a substantially constant AC voltage.

10. The method of claim 8, wherein the oscillation frequency is predetermined to minimize an impedance of an electrochemical reaction at electrodes of the battery.

11. The method of claim 8, wherein the oscillation frequency is predetermined to respective differences of temperatures with respect to the phase difference and the SOC of the battery.

12. The method of claim 8, further comprising:
in response to the battery not being completely discharged, discharging the battery by a predetermined amount, reapplying the AC current to the battery, and re-measuring the phase difference.

13. The battery of claim 8, further comprising:
determining whether the phase difference according to the SOC of the battery is measured with regard to substantially all internal temperatures of the battery at intervals within a predetermined range, in response to determining that the battery is completely discharged.

14. The battery of claim 8, further comprising:
fully charging the battery, in response to determining that a phase difference according to the SOC of the battery is not measured with regard to substantially all internal temperatures of the battery at intervals within a predetermined range.

15. The method of claim 8, wherein the estimating of the internal temperature of the battery comprises estimating the internal temperature of the battery based on the phase difference and a temperature estimation equation that defines a predetermined relationship between phrase differences, internal temperatures, and states of charge (SoCs), including a relationship between the phase difference, the SoC, and the internal temperature.

16. The method of claim 15, wherein the temperature estimation equation, defining the relationship between the phrase differences, the internal temperatures, and the states of charge (SoCs), is acquired by:
applying the AC current to the battery in a state of various internal temperatures and various SoC of the battery,
measuring respective phase differences between the AC current and the AC voltage according to the various internal temperature and the various SoCs, and
correlating the various internal temperatures of the battery, the various SoCs, and the respective phase differences.

17. The method of claim 8, wherein the oscillation frequency is set for the AC current to substantially minimize an impedance of an electrochemical reaction at electrodes of the battery.

18. The method of claim 17, wherein the oscillation frequency is selected by:
applying the AC current at various frequencies to the battery in a state of various internal temperatures and various SoCs of the battery,
measuring respective phase differences between the AC current and the AC voltage according to a corresponding internal temperature and a corresponding SoC for each of the various frequencies, and
selecting the oscillation frequency that has a distinction of the phase difference among the various frequencies of the AC current applied to the battery.

19. The method of claim 18 wherein the selecting of the oscillation frequency that has the distinction of the phase difference is based on a magnitude of the phase difference between the various frequencies.

20. A battery management apparatus, the apparatus comprising:
an alternating current (AC) power supply configured to apply AC current to a battery at an oscillation frequency;
a voltmeter configured to measure an AC voltage of a battery;
an ammeter configured to measure the AC current of the battery; and
a processor configured to:
measure a phase difference between the AC current and the AC voltage that are applied to the battery;
estimate an internal temperature of the battery based on the measured phase difference and a state of charge (SoC) of the battery; and
manage the battery based on the estimated internal temperature, the measured AC voltage, and the measured current,
wherein the oscillation frequency is predetermined to maximize a difference between the phase difference of the battery at different internal temperatures of the battery.

21. The apparatus of claim 20, wherein the processor is further configured to estimate the SoC and a state of health (SoH) of the battery based on the estimated internal temperature, the measured AC voltage, and the measured AC current.

22. The apparatus of claim 20, further comprising a battery manager configured to either one or both of:
control heat of the battery and
adjust either one or both of the AC voltage or the AC current to the battery based on the estimated internal temperature, the measured AC voltage, and the measured AC current.

23. The apparatus of claim 20, wherein the oscillation frequency of the AC current is selected to substantially minimize an impedance caused by an electrochemical reaction at electrodes of the battery.

24. The apparatus of claim 23, wherein the processor is further configured to:
set the oscillation frequency based on a selecting of the oscillation frequency by applying the AC current at various frequencies to the battery in a state of various internal temperatures and various SoC of the battery,
measure respective phase differences between the AC current and the AC voltage according to a corresponding internal temperature and SoC for each of the various frequencies, and
select the oscillation frequency that has a distinction of the phase difference among the various frequencies of the AC current applied to the battery.

25. The apparatus of claim 20, further comprising:
a temperature estimator configured to estimate the internal temperature of the battery based on the phase difference and a temperature estimation equation that defines a predetermined relationship between phrase differences, internal temperatures, and states of charge (SoCs), including a relationship between the phase difference, the SoC and the internal temperature.

26. The apparatus of claim 25, wherein the temperature estimator is further configured to generate the temperature estimation equation, defining the relationship between the phrase differences, the internal temperatures, and the states of charge (SoCs), by:
applying the AC current to the battery in a state of various internal temperatures and various SoC of the battery,
measuring respective phase differences between the AC current and the AC voltage according to the various internal temperatures and the various SoCs, and correlating the various internal temperature of the battery, the SoCs, and the respective phase differences.

* * * * *